(12) United States Patent
Kouno (10) Patent No.: US 10,272,796 B2
(45) Date of Patent: Apr. 30, 2019

(54) COOLING STRUCTURE FOR BATTERY PACK

(71) Applicant: TOYOTA JIDOSHA KABUSHIKI KAISHA, Toyota-shi, Aichi-ken (JP)

(72) Inventor: Masatoshi Kouno, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 159 days.

(21) Appl. No.: 15/534,191

(22) PCT Filed: Dec. 7, 2015

(86) PCT No.: PCT/IB2015/002300
§ 371 (c)(1),
(2) Date: Jun. 8, 2017

(87) PCT Pub. No.: WO2016/092358
PCT Pub. Date: Jun. 16, 2016

(65) Prior Publication Data
US 2017/0334309 A1    Nov. 23, 2017

(30) Foreign Application Priority Data
Dec. 9, 2014   (JP) .................................. 2014-248678

(51) Int. Cl.
| | |
|---|---|
| *H01M 10/60* | (2014.01) |
| *B60L 11/18* | (2006.01) |
| *H01M 10/62* | (2014.01) |
| *B60K 1/00* | (2006.01) |
| *B60K 11/06* | (2006.01) |

(Continued)

(52) U.S. Cl.
CPC ............ *B60L 11/1874* (2013.01); *B60K 1/00* (2013.01); *B60K 1/04* (2013.01); *B60K 11/06* (2013.01); *B60L 11/1877* (2013.01); *H01M 10/613* (2015.04); *H01M 10/62* (2015.04); *H01M 10/625* (2015.04); *H01M 10/6557* (2015.04);

(Continued)

(58) Field of Classification Search
None
See application file for complete search history.

(56) References Cited

U.S. PATENT DOCUMENTS

| | | | |
|---|---|---|---|
| 2001/0026887 A1 | 10/2001 | Minamiura et al. | |
| 2004/0010357 A1 | 1/2004 | Kubota et al. | |
| 2008/0251246 A1* | 10/2008 | Ohkuma | B60K 1/04 165/287 |

(Continued)

FOREIGN PATENT DOCUMENTS

| | | |
|---|---|---|
| CN | 1874051 A | 12/2006 |
| EP | 2226212 A1 | 9/2010 |

(Continued)

*Primary Examiner* — Scott J. Chmielecki
(74) *Attorney, Agent, or Firm* — Sughrue Mion, PLLC (57) ABSTRACT

A cooling structure for a battery pack is provided. The battery pack is positioned in a luggage space of a vehicle. The cooling structure includes an intake port, a blower, a first duct, and a second duct. An intake port is positioned in an occupant space. A blower is positioned on a side opposite to the occupant space across the battery pack, and configured to supply air blowing in from the intake port to the battery pack. A first duct is configured to connect the intake port and an inflow port of the blower to each other. A second duct is configured to connect an outflow port of the blower and a suction port of the battery pack to each other.

11 Claims, 4 Drawing Sheets

(51) Int. Cl.
    *H01M 10/613* (2014.01)
    *H01M 10/625* (2014.01)
    *H01M 10/6557* (2014.01)
    *B60K 1/04* (2019.01)

(52) U.S. Cl.
    CPC .......... *B60K 2001/005* (2013.01); *B60K 2001/0416* (2013.01); *H01M 2220/20* (2013.01)

(56) References Cited

U.S. PATENT DOCUMENTS

| | | | |
|---|---|---|---|
| 2012/0263988 A1* | 10/2012 | Obasih | H01M 10/625 429/98 |
| 2013/0330587 A1 | 12/2013 | Takahashi et al. | |
| 2014/0069113 A1 | 3/2014 | Oh et al. | |
| 2014/0262573 A1* | 9/2014 | Ito | B60K 1/04 180/68.5 |

FOREIGN PATENT DOCUMENTS

| | | |
|---|---|---|
| EP | 2772394 A1 | 9/2014 |
| JP | 2004-001683 A | 1/2004 |
| JP | 2008-221988 A | 9/2008 |
| JP | 2008-269985 A | 11/2008 |
| JP | 2009040152 A | 2/2009 |
| JP | 2009-123398 A | 6/2009 |
| JP | 2009292328 A | 12/2009 |
| JP | 2011-031778 A | 2/2011 |
| JP | 2012199205 A | 10/2012 |
| JP | 2014-053275 A | 3/2014 |
| WO | 2012/066875 A1 | 5/2012 |
| WO | 2013073463 A1 | 5/2013 |

\* cited by examiner

COOLING STRUCTURE FOR BATTERY PACK

CROSS REFERENCE TO RELATED APPLICATIONS

This application is a National Stage of International Application No. PCT/IB2015/002300 filed Dec. 7, 2015, claiming priority based on Japanese Patent Application No. 2014-248678 filed Dec. 9, 2014, the contents of all of which are incorporated herein by reference in their entirety.

BACKGROUND OF THE INVENTION

1. Field of the Invention

The invention relates to a cooling structure for a battery pack that supplies electric power to a traveling motor of a vehicle.

2. Description of Related Art

A hybrid vehicle or an electric car is provided with a battery that supplies electric power to a traveling motor. When the temperature of the battery rises, the input-output characteristics of the battery are reduced or the battery becomes increasingly deteriorated. Accordingly, the battery is provided with a cooling structure. Cooling can be performed with air supplied to the battery by a blower being driven as disclosed in, for example, Japanese Patent Application Publication No. 2011-031778 (JP 2011-031778 A).

According to JP 2011-031778 A, however, a driving sound of the blower is easily heard by an occupant because the blower is placed near a seat in an occupant space. Accordingly, the driving sound (noise) of the blower is easily sensed by the occupant and the occupant might feel uncomfortable therewith.

SUMMARY OF THE INVENTION

The invention provides a cooling structure for a battery pack in which air blows in from an occupant space positioned closer to the center of a vehicle than a luggage space where the battery pack is placed, the cooling structure allowing blower noise to be less likely to be sensed by an occupant.

A cooling structure for a battery pack is provided. The battery pack is configured to supply electric power to a traveling motor of a vehicle, and positioned in a luggage space of the vehicle. The cooling structure includes an intake port, a blower, a first duct, and a second duct. An intake port is positioned in an occupant space. A blower is positioned on a side opposite to the occupant space across the battery pack, and configured to supply air blowing in from the intake port to the battery pack. A first duct is configured to connect the intake port and an inflow port of the blower to each other. A second duct is configured to connect an outflow port of the blower and a suction port of the battery pack to each other.

According to the above-described aspect of the invention, the blower is placed at a position spaced apart from the occupant space across the battery pack in the cooling structure in which air blows in from the occupant space positioned closer to the center of the vehicle than the luggage space where the battery pack is placed. Accordingly, a driving sound of the blower (blower noise) becomes less likely to be heard by an occupant and the occupant is unlikely to sense the blower noise. Accordingly, the occupant's discomfort attributable to the blower noise is reduced.

According to the above-described aspect of the invention, the occupant space may be positioned in front of the luggage space in the vehicle. The blower may be positioned behind the battery pack in the vehicle.

According to the above-described aspect of the invention, the battery pack may include at least two compartments in a vehicle lateral direction. The compartments may include a first compartment including a first suction port, and a second compartment including a second suction port. The intake port may include a first intake port and a second intake port. The blower may include a first blower and a second blower. The first duct may include a first-compartment first duct and a second-compartment first duct. The second duct may include a first-compartment second duct and a second-compartment second duct. The first intake port, the first blower, the first-compartment first duct, and the first-compartment second duct may be placed corresponding to the first compartment. The second intake port, the second blower, the second-compartment first duct, and the second-compartment second duct may be placed corresponding to the second compartment. The first blower may be configured to supply air blowing in from the first intake port to the battery pack via the first suction port. The second blower may be configured to supply air blowing in from the second intake port to the battery pack via the second suction port. The cooling structure may include a first duct unit and a second duct unit. The first duct unit may be placed corresponding to positions of the first blower and the first suction port in the first compartment, and include the first-compartment first duct and the first-compartment second duct. The second duct unit may be placed corresponding to positions of the second blower and the second suction port in the second compartment, and include the second-compartment first duct and the second-compartment second duct.

According to the above-described aspect of the invention, electronic equipment disposed in the battery pack may be placed in a region of the battery pack corresponding to the first compartment. The first intake port may be placed below the second intake port in a vehicle vertical direction.

According to the above-described aspect of the invention, the first intake port may be disposed below a seat cushion of a seat placed in the occupant space. The second intake port may be disposed above the seat cushion, and the first intake port and the second intake port may be disposed on both sides of the seat cushion in the vehicle lateral direction.

According to the above-described aspect of the invention, the first duct unit and the second duct unit may be placed on both sides in the vehicle lateral direction across the battery pack.

According to the above-described aspect of the invention, the first duct and the second duct may be placed in alignment in a vehicle vertical direction.

According to the above-described aspect of the invention, the first-compartment first duct and the first-compartment second duct may be placed in alignment in a vehicle vertical direction, and the second-compartment first duct and the second-compartment second duct may be placed in alignment in the vehicle vertical direction.

According to the above-described aspect of the invention, the battery pack may include a plurality of battery modules stacked in a vehicle vertical direction. The plurality of battery modules include an upper side battery module which is disposed on an upper side of the battery pack, and a lower side battery module which is disposed on a lower side of the battery pack. The second duct may be configured to be connected to an upper side suction port corresponding to the upper side battery module and a lower side suction port corresponding to the lower side battery module, respectively. The second duct may be configured as an intake path supplying air to each of the upper side battery module and the lower side battery module.

According to the above-described aspect of the invention, the battery pack may include a plurality of battery modules stacked in a vehicle vertical direction. The plurality of battery modules may include a first-compartment upper side battery module, a second-compartment upper side battery module, a first-compartment lower side battery module, and a second-compartment lower side battery module. The first-compartment upper side battery module and the second-compartment upper side battery module may be disposed on an upper side of the battery pack. The first-compartment lower side battery module and the second-compartment lower side battery module may be disposed on a lower side of the battery pack. The first-compartment second duct may be configured to be connected to each of a first-compartment upper side suction port corresponding to the first-compartment upper side battery module and a first-compartment lower side suction port corresponding to the first-compartment lower side battery module. The second-compartment second duct may be configured to be connected to each of a second-compartment upper side suction port corresponding to second-compartment upper side battery module and a second-compartment lower side suction port corresponding to the second-compartment lower side battery module. The first-compartment second duct may be configured as an intake path supplying air to each of the first-compartment upper side battery module and the first-compartment lower side battery module. The second-compartment second duct may be configured as an intake path supplying air to each of the second-compartment upper side battery module and the second-compartment lower side battery module.

According to the above-described aspect of the invention, the second duct may include a first branch duct connected to the upper side suction port and a second branch duct connected to the lower side suction port. The first duct may be placed to be interposed between the first branch duct and the second branch duct in the vehicle vertical direction.

According to the above-described aspect of the invention, the first-compartment second duct may include a first-compartment first branch duct connected to the first-compartment upper side suction port and a first-compartment second branch duct connected to the first-compartment lower side suction port. The second-compartment second duct may include a second-compartment first branch duct connected to the second-compartment upper side suction port and a second-compartment second branch duct connected to the second-compartment lower side suction port. The first-compartment first duct may be placed to be interposed between the first-compartment first branch duct and the first-compartment second branch duct in the vehicle vertical direction. The second-compartment first duct may be placed to be interposed between the second-compartment first branch duct and the second-compartment second branch duct in the vehicle vertical direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
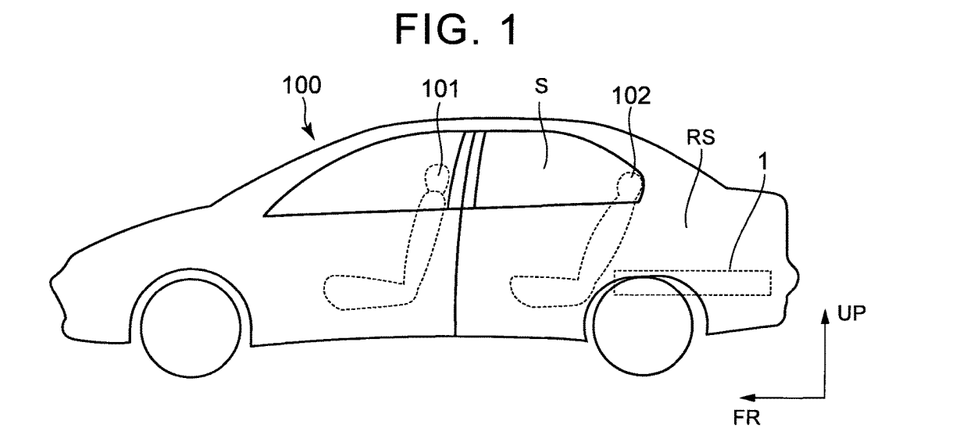
FIG. 1 is a schematic side view of a battery pack-mounted vehicle according to Embodiment 1.

FIGS. 1 to 8 are drawings illustrating Embodiment 1 of the invention. FIG. 1 is a schematic side view of a vehicle. In FIG. 1, an arrow FR represents a vehicle forward direction (direction in which the vehicle moves forward), an arrow UP represents a vehicle upward direction, and an arrow RH represents a vehicle lateral direction (vehicle width direction). The same relationship of these arrows FR, UP, RH is applied to the other drawings as well.

In a vehicle 100, seats 101, 102 are placed in an occupant space S where an occupant rides. The seat 101 is a driver's seat or a passenger seat. The seat 102 is a rear seat. A luggage space RS is disposed in a space behind the seat 102. The luggage space RS is a space in which luggage of the vehicle 100 or the like is accommodated. In a case where a plurality of the seats 102 are arranged in the occupant space S behind the seat 101, the luggage space RS is disposed in a space behind the rearmost one of the seats 102.

A battery pack 1 according to this embodiment is placed in the luggage space RS. The battery pack 1 is fixed to a floor panel of the luggage space RS and is provided with a cooling structure (described later).

The battery pack 1 is a battery pack that is provided with one or more packed batteries. The battery pack 1 outputs energy that is used for the traveling of the vehicle 100. A hybrid car and an electric car are two examples of the vehicle 100. The hybrid car is a vehicle that is provided with another power source, such as a fuel cell and an internal combustion engine, in addition to the battery pack 1 as a power source for the traveling of the vehicle 100. The electric car is a vehicle that is provided with nothing but the battery pack 1 as a power source for the vehicle 100.

The battery pack 1 is connected to a motor generator. The motor generator is a traveling motor that generates kinetic energy for the traveling of the vehicle 100 by receiving electric power supplied from the battery pack 1. The motor generator is connected to a vehicle wheel, and the kinetic energy that is generated by the motor generator is transmitted to the vehicle wheel. When the vehicle 100 is decelerated or stopped, the motor generator converts kinetic energy resulting from the braking of the vehicle 100 into electrical energy. The electrical energy that is generated by the motor generator can be stored in the battery pack 1 (packed battery). A DC/DC converter and an inverter can be placed in an electric current path between the battery pack 1 and the motor generator.

Figure 2:
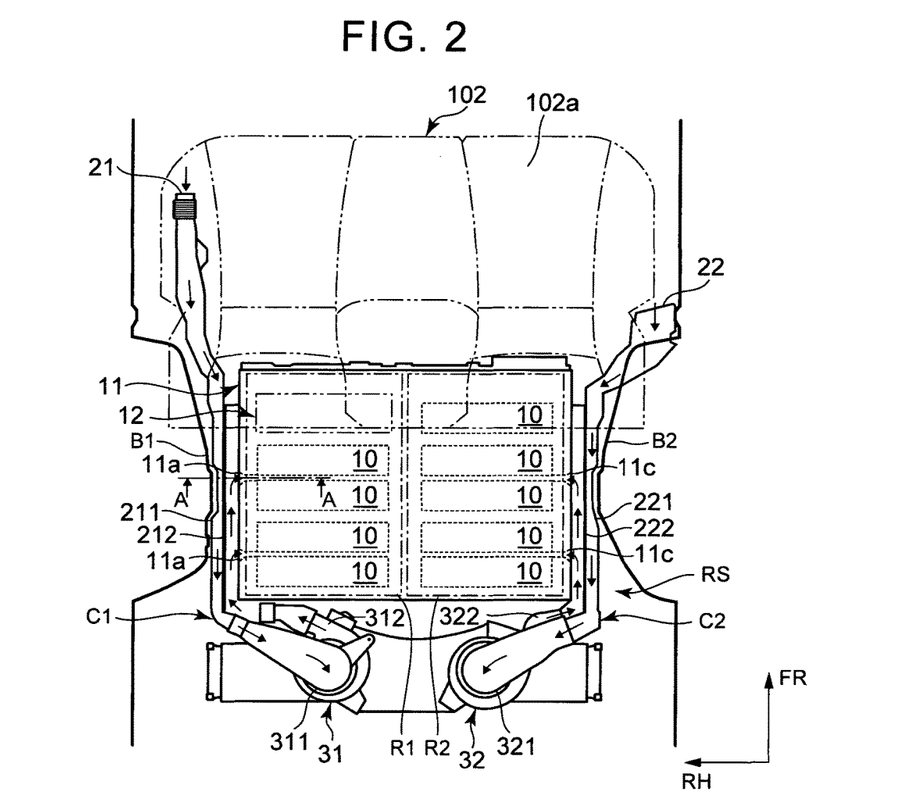
FIG. 2 is a top view illustrating an in-car structure of the battery pack provided with a cooling structure according to Embodiment 1.
Figure 3:
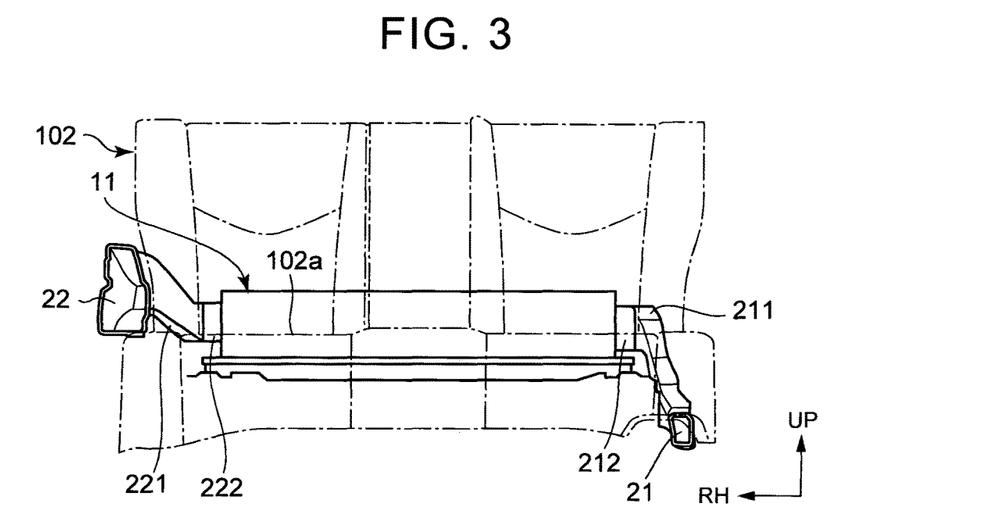
FIG. 3 is a front view illustrating the in-car structure of the battery pack provided with the cooling structure according to Embodiment 1.

FIG. 2 is a top view illustrating an in-car structure of the battery pack provided with the cooling structure according to this embodiment, and FIG. 3 is a front view of FIG. 2. In the example illustrated in FIGS. 2 and 3, the seat 102 is shown by one-dot chain lines.

In the battery pack 1, a plurality of packed batteries 10 are accommodated in a case member 11 as illustrated in FIG. 2. A plurality of electric cells that are connected in series or the like can constitute the packed battery 10, which is a battery module. A secondary battery such as a nickel-hydrogen battery and a lithium-ion battery can be used as the electric cell. In addition, an electric double layer capacitor (capacitor) can be used instead of the secondary battery. The number of the electric cells that constitute the packed battery 10 and the number of the packed batteries 10 can be appropriately set based on a required output and the like. In addition, the packed battery 10 may include a plurality of electric cells that are connected in parallel. The plurality of packed batteries 10 can be connected in series or in parallel to each other.

The cooling structure of the battery pack 1 that is placed in the luggage space RS of the vehicle 100 is provided with a first cooling structure C1 and a second cooling structure C2. The first cooling structure C1 is provided with an intake port 21 (corresponding to a first intake port) that is open toward the occupant space S which is positioned in front of the luggage space RS in the vehicle, a blower 31 (corresponding to a first blower) that is placed behind the battery pack 1 in the vehicle and supplies air in the occupant space S blowing in from the intake port 21 to the battery pack 1, a first duct 211 (corresponding to a first-compartment first duct) that connects the intake port 21 and an inflow port 311 of the blower 31 to each other and extends toward the blower 31 positioned in the back of the vehicle across the battery pack 1 from the intake port 21 positioned in front of the battery pack 1 in the vehicle, and a second duct 212 (corresponding to a first-compartment second duct) that connects an outflow port 312 of the blower 31 and a suction port 11a of the battery pack 1 to each other and extends toward the front of the vehicle from the blower 31 with respect to the battery pack 1 positioned in front of the blower 31 in the vehicle.

The second cooling structure C2 is provided with an intake port 22 (corresponding to a second intake port) that is open toward the occupant space S which is positioned in front of the luggage space RS in the vehicle, a blower 32 (corresponding to a second blower) that is placed behind the battery pack 1 in the vehicle and supplies air in the occupant space S blowing in from the intake port 22 to the battery pack 1, a first duct 221 (corresponding to a second-compartment first duct) that connects the intake port 22 and an inflow port 321 of the blower 32 to each other and extends toward the blower 32 positioned in the back of the vehicle across the battery pack 1 from the intake port 22 positioned in front of the battery pack 1 in the vehicle, and a second duct 222 (corresponding to a second-compartment second duct) that connects an outflow port 322 of the blower 32 and a suction port 11c of the battery pack 1 to each other and extends toward the front of the vehicle from the blower 32 with respect to the battery pack 1 positioned in front of the blower 32 in the vehicle.

The battery pack 1 according to this embodiment can be partitioned into two or more regions in the RH direction. For example, the battery pack 1 can be partitioned into a region R1 on the left side and a region R2 on the right side of a substantially central site in the RH direction as illustrated by the one-dot chain line in FIG. 2, and the plurality of packed batteries 10 can be configured to be placed in each of the regions R1, R2. The region R1 is an example of a first compartment and the region R2 is an example of a second compartment. A first compartment includes the R1 and the C1. A second compartment includes the R2 and the C2.

In this embodiment, the intake ports 21, 22 that are independent of each other are disposed in the partitioned regions R1, R2, respectively. In addition, the cooling structures C1, C2 are disposed corresponding to the respective intake ports 21, 22. As described later, the two cooling structures C1, C2 have the same configuration except for the positions of the intake ports 21, 22, and the cooling structure C1 that is corresponding to the region R1 is connected to the first suction port 11a disposed in the battery pack 1. The cooling structure C2 that is corresponding to the region R2 is connected to the second suction port 11c disposed in the battery pack 1. The first suction port 11a and the second suction port 11c are opening portions that communicate with the inside of the battery pack 1 formed in the case member 11. In the example illustrated in FIG. 2, the suction port 11a and the suction port 11c are disposed in respective side surfaces of the battery pack 1 in the RH direction.

As illustrated in FIG. 3, the intake port 21 and the intake port 22 are spaced apart from each other in the RH direction. The intake port 21 and the intake port 22 are disposed on both sides of a seat cushion 102a. The intake port 21 of the cooling structure C1 is disposed below the seat cushion 102a of the seat 102 that is placed in front of the luggage space RS in the vehicle and is open toward the occupant space S. The intake port 22 of the cooling structure C2 is disposed above the seat cushion 102a and is open toward the occupant space S. The sizes of the respective openings of the intake port 21 and the intake port 22 can be appropriately set.

As illustrated in FIG. 2, the intake port 21 is positioned in the vicinity of a front side end portion of the seat cushion 102a and is placed in front of the intake port 22 in the FR direction. The intake port 22 is placed in the vicinity of a rear side end portion of the seat cushion 102a. For example, the intake port 22 is placed to be aligned with a backrest of the seat 102 in the RH direction.

The first duct 211 and the second duct 212 constituting the cooling structure C1 are configured as a duct unit that is connected to the blower 31 which is placed behind the battery pack 1 in the vehicle (corresponding to a first duct unit). Likewise, the first duct 221 and the second duct 222 constituting the cooling structure C2 are configured as a duct unit that is connected to the blower 32 which is placed behind the battery pack 1 in the vehicle (corresponding to a second duct unit).

The duct unit of the cooling structure C1 is placed between a body B1 on a left side surface of the vehicle 100 in the RH direction and the battery pack 1. The duct unit of the cooling structure C2 is placed between a body B2 on a right side surface of the vehicle 100 on the side opposite to the body B1 and the battery pack 1. The blowers 31, 32 are placed behind the battery pack 1 in the FR direction and are aligned with each other in the RH direction. The battery pack 1 is placed in the luggage space RS, interposed between the respective duct units of the cooling structures C1, C2.

The blowers 31, 32 are placed behind a rear side surface of the battery pack 1 in the FR direction and are placed inside left and right side surfaces of the battery pack 1 in the RH direction. The respective duct units of the cooling structures C1, C2 are bent to wrap around a rear side of the battery pack 1 in the FR direction. In the in-car structure of the battery pack 1 that is provided with the cooling structures C1, C2 across the battery pack 1, the blowers 31, 32 are placed at the rearmost part with respect to the occupant space S. In other words, in the structure that surrounds the battery pack 1 in the RH direction with the cooling structures C1, C2, the blowers 31, 32 are placed at the positions farthest away from the intake ports 21, 22 in the FR direction, respectively.

Figure 4:
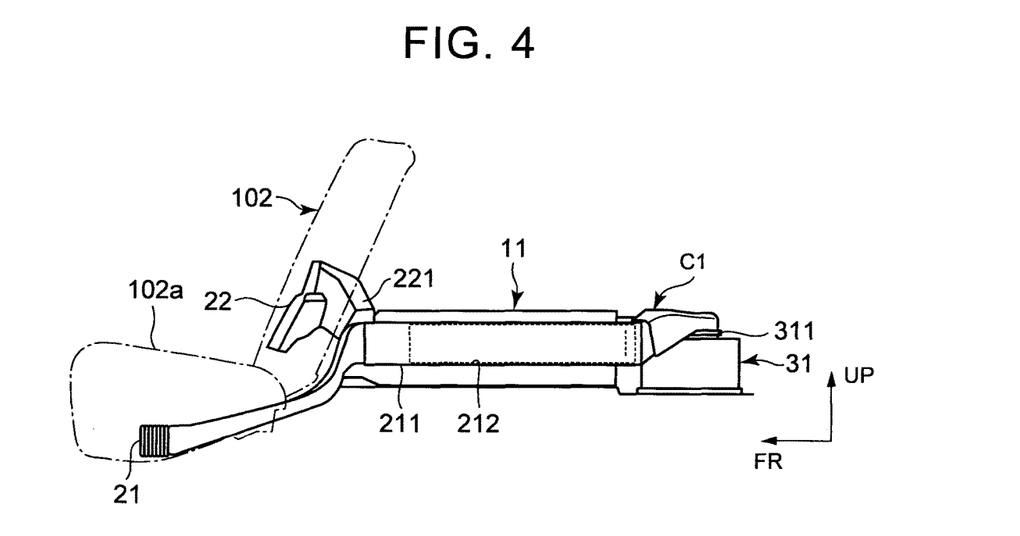
FIG. 4 is a left side view illustrating the in-car structure of the battery pack provided with the cooling structure according to Embodiment 1.

FIG. 4 is a left side view illustrating the in-car structure of the battery pack provided with the cooling structure according to this embodiment, which mainly illustrates the cooling structure C1 illustrated in FIG. 2. The seat 102 is shown by a one-dot chain line. As illustrated in FIG. 4, the first duct 211 extends in a vehicle longitudinal direction (FR direction) from the intake port 21 to the blower 31. One end of the first duct 211 is connected to the intake port 21, and the other end of the first duct 211 is connected to the inflow port 311 of the blower 31.

The second duct 212 extends from the outflow port 312 of the blower 31 toward the battery pack 1 in the front in the vehicle. In the example illustrated in FIG. 4, the second duct 212 is shown by a dotted line. The second duct 212 extends from the blower 31 toward the front of the vehicle along the left side surface of the battery pack 1 in the RH direction. The first duct 211 and the second duct 212 are placed between the left side surface of the battery pack 1 in the RH direction and the body B1 (refer to FIG. 2).

The first duct 211 extends from the intake port 21 toward the blower 31 and toward the back of the vehicle. The second duct 212 extends from the blower 31 toward the front of the vehicle. In other words, the first duct 211 and the second duct 212 are placed to be folded back by the blower 31. In this case, the first duct 211 is placed outside the second duct 212 in the RH direction (refer to FIG. 2).

Figure 5:
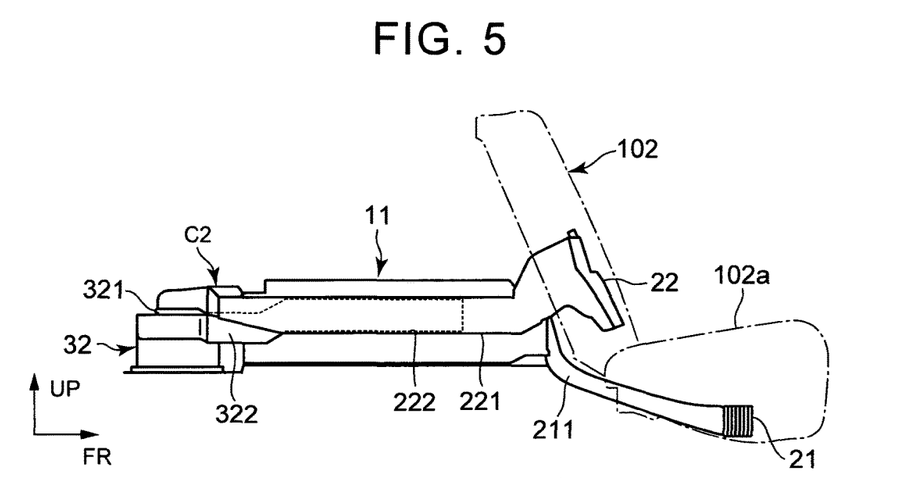
FIG. 5 is a right side view illustrating the in-car structure of the battery pack provided with the cooling structure according to Embodiment 1.

FIG. 5 is a right side view illustrating the in-car structure of the battery pack provided with the cooling structure according to this embodiment, which mainly illustrates the cooling structure C2 illustrated in FIG. 2. The seat 102 is shown by a one-dot chain line. As illustrated in FIG. 5, the first duct 221 extends in the vehicle longitudinal direction (FR direction) from the intake port 22 to the blower 32. One end of the first duct 221 is connected to the intake port 22, and the other end of the first duct 221 is connected to the inflow port 321 of the blower 32.

The second duct 222 extends from the outflow port 322 of the blower 32 toward the battery pack 1 in front in the vehicle. The second duct 222 extends from the blower 32 toward the front of the vehicle along the right side surface of the battery pack 1 in the RH direction. The first duct 221 and the second duct 222 are placed between the right side surface of the battery pack 1 in the RH direction and the body B2. The second duct 222 of the second cooling structure C2 extends from the blower 32 toward the front of the vehicle as in the case of the first cooling structure C1, and the first duct 221 is placed outside the second duct 222 in the RH direction (refer to FIG. 2). In other words, the first duct 221 and the second duct 222 are placed to be folded back by the blower 32.

Figure 6:
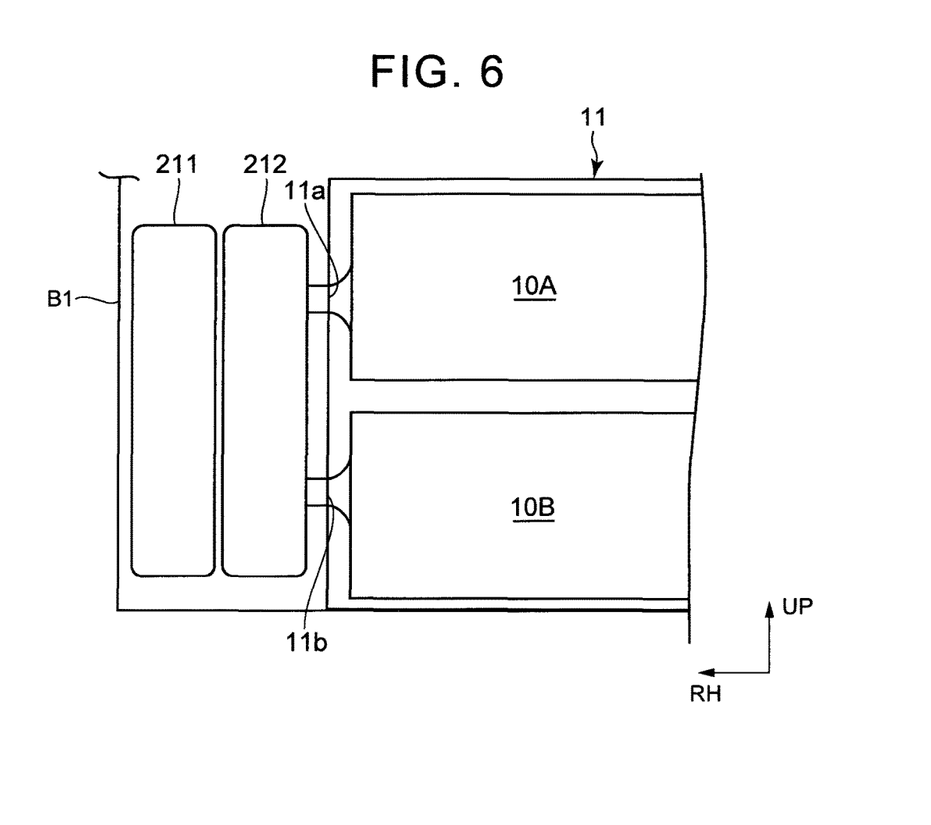
FIG. 6 is a schematic sectional view of a duct unit according to Embodiment 1.

FIG. 6 is a schematic sectional view of the duct unit of the cooling structure C1, which shows an A-A cross section of FIG. 2. As illustrated in FIG. 6, the first duct 211 and the second duct 212 can have a rectangular cross-sectional shape vertically long in the UP direction. The first duct 211 and the second duct 212 are adjacent to each other in the RH direction, and the second duct 212 is connected to the suction port 11a of the case member 11 and a suction port 11b of the case member 11.

As illustrated in the example of FIG. 6, the packed batteries 10 can be placed to be stacked in the UP direction (vehicle vertical direction). In this embodiment, a plurality of battery units in which the packed batteries 10 are stacked in two, upper and lower, stages are placed in the case member 11. The upper side suction port 11a and the lower side suction port 11b are disposed in the case member 11, aligned in the UP direction. A plurality of the upper side suction ports 11a and a plurality of the lower side suction ports 11b are disposed in the case member 11 for the respective battery units.

The second duct 212 is connected to each of the upper side suction port 11a corresponding to an upper side packed battery 10A (corresponding to a first-compartment upper side battery module) disposed in the battery pack 1 and the lower side suction port 11b corresponding to a lower side packed battery 10B (corresponding to a first-compartment lower side battery module) disposed in the battery pack 1. In this case, the second duct 212 is also used as an intake path for air supplied to each of the upper and lower packed batteries 10A, 10B.

As illustrated in the example of FIG. 2, the plurality of battery units stacked in two, upper and lower, stages can be placed in alignment in the vehicle longitudinal direction. In this case, a space between the adjacent battery units can be configured to be formed as a path for airflow. Accordingly, each of the upper side suction port 11a and the lower side suction port 11b can be disposed in the case member 11 corresponding to the path between the adjacent battery units.

The duct unit of the second cooling structure C2 has a similar configuration. The upper side suction port 11c and a lower side suction port 11d are disposed for each battery unit in the case member 11, and the second duct 222 is connected to each of the upper side suction port 11c corresponding to upper side packed battery 10A and the lower side suction port 11d corresponding to the lower side packed battery 10B. The second duct 222 is also used as an intake path for the air supplied to each of the upper and lower packed batteries 10A, 10B. The second cooling structure C2 is similar to the first cooling structure C1 with regard to the rest of the configuration as well.

Figure 7:
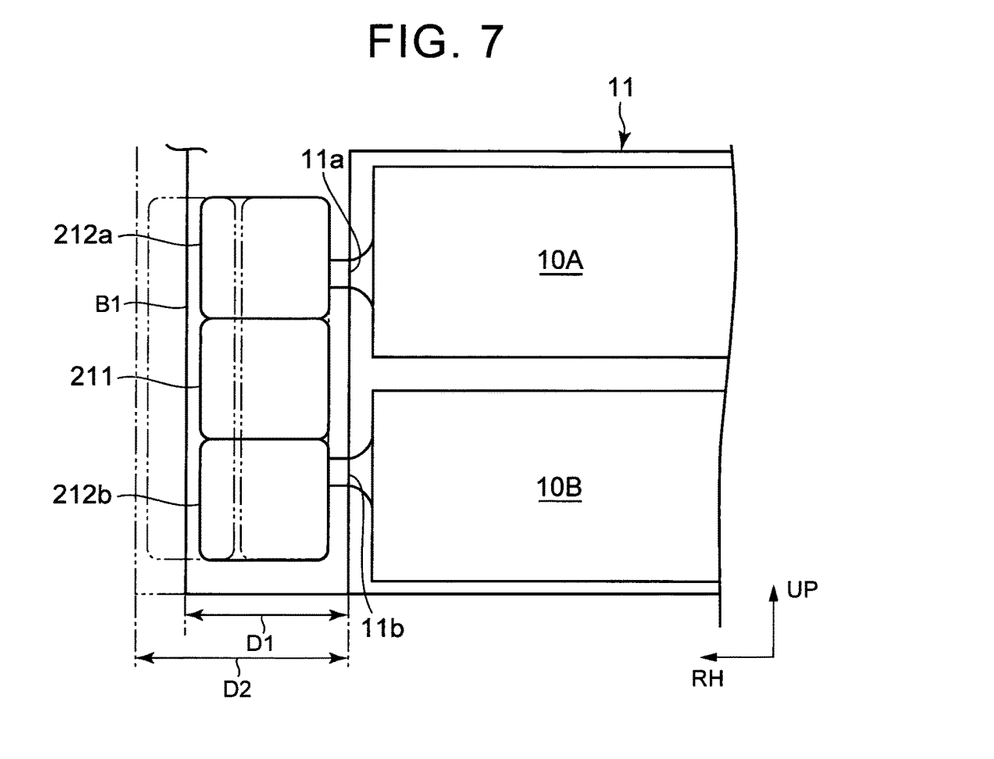
FIG. 7 is a schematic sectional view illustrating a modification example of the duct unit according to Embodiment 1.
Figure 8:
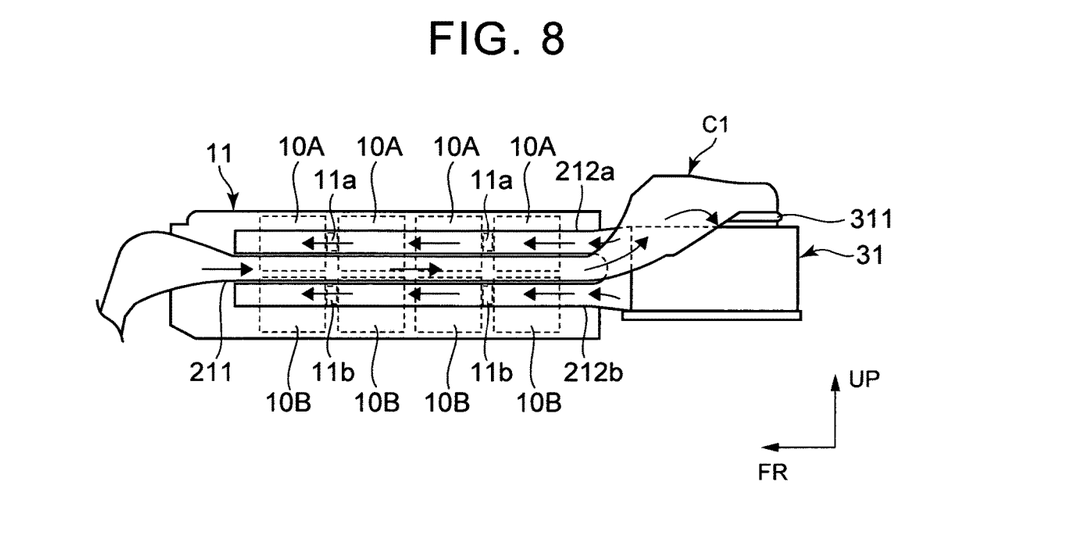
FIG. 8 is a schematic side view for showing a branch example of a second duct constituting the duct unit according to the modification example in FIG. 7.

FIGS. 7 and 8 are drawings illustrating a modification example of this embodiment. FIG. 7 is a schematic sectional view of a duct unit, and FIG. 8 is a schematic side view for showing an example of branch configuration regarding the second duct 212 that constitutes the duct unit. The first cooling structure C1 will be used as an example in the following description of this modification example, and the same description can be applied to the second cooling structure C2 as well. In the cooling structure C2, the upper side battery module corresponds to a second-compartment upper side battery module, and the lower side battery module corresponds to a second-compartment lower side battery module.

As illustrated in FIG. 7, the first duct 211 and the second duct 212 can be placed in vertical alignment in the UP direction. As illustrated in FIG. 8, the second duct 212 bifurcates from the outflow port 312 of the blower 31 to branch into a first branch duct 212a connected to the upper side suction port 11a and a second branch duct 212b connected to the lower side suction port 11b.

As illustrated in FIG. 7, the first duct 211 is placed between the first branch duct 212a and the second branch duct 212b, and each of the ducts is placed in alignment in the UP direction so that the first duct 211 is interposed between the first branch duct 212a and the second branch duct 212b.

Each of the first duct 211, the first branch duct 212a, and the second branch duct 212b that are aligned in the UP direction has a substantially square cross-sectional shape as illustrated in FIG. 7 instead of having a vertically long cross-sectional shape in the UP direction as illustrated in the example of FIG. 6.

According to the cooling structure of the battery pack 1 of this embodiment, air blowing into the battery pack 1 is discharged from a discharge port (not illustrated) disposed in the case member 11 into the luggage space RS, and the cooling structure can be configured to be provided with no discharge duct. For example, the discharge port in the case member 11 can be formed in an upper portion or a lower portion in the vicinity of a boundary of the regions R1, R2. The position of the discharge port can be arbitrarily set. The cooling structure according to this embodiment is applicable even when the case member 11 is configured to have the discharge port disposed therein.

As described above, the cooling structure of the battery pack according to this embodiment is a cooling structure that takes in air from the occupant space S which is positioned in front of the luggage space RS, where the battery pack 1 is placed, in the vehicle, and the blowers 31, 32 are placed at positions spaced apart from the occupant space S across the battery pack 1. Accordingly, driving sounds (blower noise) of the blowers 31, 32 are unlikely to be heard by the occupant, and the occupant is unlikely to sense the blower noise. Accordingly, the occupant's discomfort attributable to the blower noise is reduced.

In this embodiment, the two intake ports 21, 22 are disposed, the battery pack 1 is partitioned into the two regions R1, R2 in the RH direction, and the two cooling structures C1, C2 are disposed with respect to the respective partitioned regions R1, R2. The air that blows in from the two intake ports 21, 22 is individually supplied to the respective regions R1, R2, and thus the packed batteries 10 that are placed in the respective regions R1, R2 can be uniformly cooled.

In an example of air flow in which the region R1 is on the upstream side and the region R2 is on the downstream side, the packed battery 10 on the downstream side is affected by the heat of the packed battery 10 on the upstream side, which results in a reduction in cooling efficiency. In this embodiment, however, the air is individually supplied to the respective regions R1, R2 from the two intake ports 21, 22, and thus the respective packed batteries 10 placed in the regions R1, R2 can be uniformly cooled.

In the description of this embodiment, the in-car structure of the battery pack 1 that is provided with the two cooling structures C1, C2 has been described as an example. However, the invention is not limited thereto. For example, only one of the cooling structures C1, C2 may be provided depending on the structure of the arrangement of the packed batteries 10 in the battery pack 1 and the number of the packed batteries 10. In addition, only one packed battery 10 may be accommodated in the battery pack 1.

The respective second ducts 212, 222 and the respective first ducts 211, 221 of the first cooling structure C1 and the second cooling structure C2 are configured to be folded back by the blowers 31, 32 on the side surfaces of the battery pack 1 in the RH direction, and each of the second ducts extends toward the front of the vehicle. However, the invention is not limited thereto. For example, the second ducts 212, 222 can be configured to be connected to the rear side surface of the battery pack 1 in the FR direction from the blowers 31, 32, respectively. In this case, the respective second ducts 212, 222 can be configured not to extend beyond the rear side surface of the battery pack 1 in the FR direction while extending toward the battery pack 1 positioned in front of the blowers 31, 32 in the vehicle.

In addition, each of the duct units of the first cooling structure C1 and the second cooling structure C2 can be connected to a single blower so that the first cooling structure C1 and the second cooling structure C2 share the single blower.

In addition, equipment 12 can be placed in the battery pack 1 according to this Embodiment 1 as illustrated in FIG. 2. Examples of the equipment 12 include electronic equipment such as a battery ECU performing charging and discharging control on the packed batteries 10, a junction box, a connection line for connection between the packed batteries 10 and between the battery pack 1 and the traveling motor or the like, a fuse, and a relay device.

In this case, the equipment 12 can be placed in the region R1 in the battery pack 1, and the intake port 21 corresponding to the region R1 is placed below the intake port 22 corresponding to the region R2 in the UP direction as illustrated in FIG. 3. An operation sound (noise) is generated by the equipment 12, and the operation sound of the equipment 12 might reach the occupant space S from the intake port 21 through the duct unit of the first cooling structure C1. In this embodiment, however, the intake port 21 is disposed below the intake port 22 and below the seat cushion 102a of the seat 102, and thus the operation sound of the equipment 12 is unlikely to be heard by the occupant through the second duct 212 and the first duct 211 and via the intake port 21. In addition, the intake port 22 is disposed above the intake port 21, above the seat cushion 102a of the seat 102 for example, and thus the intrusion of the dust and the like likely to be accumulated below the seat 102 can be suppressed.

In the interest of the efficiency of the placement spaces of the packed batteries 10, the packed batteries 10 can be placed by being stacked in the UP direction as described above. The second ducts 212, 222 being individually disposed with respect to the respective upper and lower packed batteries 10 in this case leads to an increase in the number of parts. In this embodiment, however, the single second duct 212 and the single second duct 222 are also used as the intake paths for the air supplied to the respective upper and lower packed batteries 10A, 10B, and thus an increase in the number of parts can be suppressed.

In a case where the packed batteries 10 are placed to be stacked in the UP direction, the second ducts 212, 222 can be configured to branch into the first branch duct connected to the upper side suction port and the second branch duct connected to the lower side suction port and each of the ducts can be configured to be placed in alignment in the UP direction so that the first ducts 211, 221 are interposed between the first branch duct and the second branch duct as illustrated in FIGS. 7 and 8. As illustrated in FIG. 7, this configuration allows the width of the duct unit (length in the RH direction) to become shorter than in the example of FIG. 6 (D1<D2). A wide placement space can be ensured for the battery pack 1 since efficiency is added to the space between the body B1 for placement on the side surface of the vehicle 100 in the RH direction and the battery pack 1.

In view of the efficiency of the placement space of the duct unit, the first duct 211 and the second duct 212 can have a flow path cross section that is vertically long in the UP direction as in the example of FIG. 6. However, pressure loss is unlikely to be reduced because the flow path width in the RH direction extremely narrows in the RH direction. In this regard, the flow path cross section is substantially square in the modification example illustrated in FIG. 7. Accordingly, a significant flow path width can be ensured in the RH direction and the UP direction, and thus the pressure loss can be reduced.

For the purpose of pressure loss reduction, the first ducts 211, 221 and the second ducts 212, 222 can be configured to be aligned in the UP direction even in a case where the two-branch configuration illustrated in FIG. 8 is not applied. This can be applied to, for example, a case where the packed batteries 10 are not stacked in two, upper and lower, stages. Even when the packed batteries 10 are stacked in two, upper and lower, stages, the single second duct 212 may be connected to the two suction ports, that is, the upper side suction port 11*a* and the lower side suction port 11*b*.

In the examples of FIGS. 6 and 7, the second ducts 212, 222 and the case member 11 are spaced apart from each other in the RH direction. However, the invention is not limited thereto. For example, the second ducts 212, 222 can also be configured to abut against side surfaces of the case member 11 in the RH direction. In addition, a guide member or the like can be appropriately disposed in an air path leading from the suction port 11*a* of the case member 11 or the like to each of the packed batteries 10. In this case, the air can be efficiently sent to each of the packed batteries 10.

The invention claimed is:

1. A cooling structure for a battery pack, the battery pack configured to supply electric power to a traveling motor of a vehicle and the battery pack being positioned in a luggage space of the vehicle, the cooling structure comprising:
   an intake port positioned in an occupant space;
   a blower positioned on a side opposite to the occupant space across the battery pack, the blower being configured to supply air blowing in from the intake port to the battery pack;
   a first duct configured to connect the intake port and an inflow port of the blower to each other; and
   a second duct configured to connect an outflow port of the blower and a suction port of the battery pack to each other,
   wherein the battery pack includes at least two compartments in a vehicle lateral direction,
   the compartments includes a first compartment and a second compartment, the first compartment including a first suction port, and the second compartment including a second suction port,
   the intake port includes a first intake port and a second intake port,
   the blower includes a first blower and a second blower,
   the first duct includes a first-compartment first duct and a second-compartment first duct,
   the second duct includes a first-compartment second duct and a second-compartment second duct,
   the first intake port, the first blower, the first-compartment first duct, and the first-compartment second duct are placed corresponding to the first compartment,
   the second intake port, the second blower, the second-compartment first duct, and the second-compartment second duct are placed corresponding to the second compartment,
   the first blower is configured to supply air blowing in from the first intake port to the battery pack via the first suction port,
   the second blower is configured to supply air blowing in from the second intake port to the battery pack via the second suction port,
   the cooling structure includes a first duct unit and a second duct unit,
   the first duct unit is placed corresponding to positions of the first blower and the first suction port in the first compartment, the first duct unit including the first-compartment first duct and the first-compartment second duct, and
   the second duct unit is placed corresponding to positions of the second blower and the second suction port in the second compartment, the second duct unit including the second-compartment first duct and the second-compartment second duct.

2. The cooling structure for a vehicle according to claim 1, wherein
   the occupant space is positioned in front of the luggage space in the vehicle, and
   the blower is positioned behind the battery pack in the vehicle.

3. The cooling structure for a vehicle according to claim 1, wherein
   electronic equipment disposed in the battery pack is placed in a region of the battery pack corresponding to the first compartment, and the first intake port is placed below the second intake port in a vehicle vertical direction.

4. The cooling structure for a vehicle according to claim 1,
   wherein the first intake port is disposed below a seat cushion of a seat placed in the occupant space, the second intake port is disposed above the seat cushion, and the first intake port and the second intake port are disposed on both sides of the seat cushion in the vehicle lateral direction.

5. The cooling structure for a vehicle according to claim 1,
   wherein the first duct unit and the second duct unit are placed on both sides in the vehicle lateral direction across the battery pack.

6. The cooling structure for a vehicle according to claim 1,
   wherein the first duct and the second duct are placed in alignment in a vehicle vertical direction.

7. The cooling structure for a vehicle according to claim 1,
   wherein the first-compartment first duct and the first-compartment second duct are placed in alignment in a vehicle vertical direction, and the second-compartment first duct and the second-compartment second duct are placed in alignment in the vehicle vertical direction.

8. The cooling structure for a vehicle according to claim 1,
   wherein the battery pack includes a plurality of battery modules stacked in a vehicle vertical direction,
   the plurality of battery modules include an upper side battery module and a lower side battery module,
   the upper side battery module is disposed on an upper side of the battery pack,
   the lower side battery module is disposed on a lower side of the battery pack,
   the second duct is configured to be connected to an upper side suction port corresponding to the upper side battery module and a lower side suction port corresponding to the lower side battery module, respectively, and the second duct is configured as an intake path supplying air to each of the upper side battery module and the lower side battery module.

9. The cooling structure for a vehicle according to claim 1, wherein
the battery pack includes a plurality of battery modules stacked in a vehicle vertical direction,
the plurality of battery modules includes a first-compartment upper side battery module, a second-compartment upper side battery module, a first-compartment lower side battery module, and a second-compartment lower side battery module,
the first-compartment upper side battery module and the second-compartment upper side battery module are disposed on an upper side of the battery pack,
the first-compartment lower side battery module and the second-compartment lower side battery module are disposed on a lower side of the battery pack,
the first-compartment second duct is configured to be connected to each of a first-compartment upper side suction port corresponding to the first-compartment upper side battery module and a first-compartment lower side suction port corresponding to the first-compartment lower side battery module,
the second-compartment second duct is configured to be connected to each of a second-compartment upper side suction port corresponding to second-compartment upper side battery module and a second-compartment lower side suction port corresponding to the second-compartment lower side battery module,
the first-compartment second duct is configured as an intake path supplying air to each of the first-compartment upper side battery module and the first-compartment lower side battery module, and
the second-compartment second duct is configured as an intake path supplying air to each of the second-compartment upper side battery module and the second-compartment lower side battery module.

10. The cooling structure for a vehicle according to claim 8, wherein
the second duct includes a first branch duct connected to the upper side suction port and a second branch duct connected to the lower side suction port, and
the first duct is placed to be interposed between the first branch duct and the second branch duct in the vehicle vertical direction.

11. The cooling structure for a vehicle according to claim 9, wherein
the first-compartment second duct includes a first-compartment first branch duct connected to the first-compartment upper side suction port and a first-compartment second branch duct connected to the first-compartment lower side suction port,
the second-compartment second duct includes a second-compartment first branch duct connected to the second-compartment upper side suction port and a second-compartment second branch duct connected to the second-compartment lower side suction port,
the first-compartment first duct is placed to be interposed between the first-compartment first branch duct and the first-compartment second branch duct in the vehicle vertical direction, and
the second-compartment first duct is placed to be interposed between the second-compartment first branch duct and the second-compartment second branch duct in the vehicle vertical direction.

* * * * *